United States Patent
Furutake et al.

(10) Patent No.: US 9,753,245 B2
(45) Date of Patent: Sep. 5, 2017

(54) OPTICAL LENS DEVICE

(71) Applicant: DENSO CORPORATION, Kariya, Aichi-pref. (JP)

(72) Inventors: Yasuki Furutake, Kariya (JP); Toshihiko Takahata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/904,012

(22) PCT Filed: Jun. 26, 2014

(86) PCT No.: PCT/JP2014/067019
§ 371 (c)(1),
(2) Date: Jan. 8, 2016

(87) PCT Pub. No.: WO2015/005127
PCT Pub. Date: Jan. 15, 2015

(65) Prior Publication Data
US 2016/0154201 A1 Jun. 2, 2016

(30) Foreign Application Priority Data

Jul. 9, 2013 (JP) .................. 2013-143841

(51) Int. Cl.
G02B 9/10 (2006.01)
G02B 7/02 (2006.01)
G02B 13/00 (2006.01)
G02B 19/00 (2006.01)

(52) U.S. Cl.
CPC ............. *G02B 7/028* (2013.01); *G02B 7/025* (2013.01); *G02B 9/10* (2013.01); *G02B 13/003* (2013.01); *G02B 19/0014* (2013.01)

(58) Field of Classification Search
CPC .......... G02B 7/028; G02B 7/025; G02B 9/10; G02B 13/003; G02B 19/0014
(Continued)

(56) References Cited

U.S. PATENT DOCUMENTS

| 2009/0086342 A1* | 4/2009 | Seki | ...................... G02B 7/028 |
| | | | 359/820 |
| 2010/0046096 A1* | 2/2010 | Hirao | ..................... B82Y 20/00 |
| | | | 359/795 |

(Continued)

FOREIGN PATENT DOCUMENTS

| JP | 2003-006908 A | 1/2003 |
| JP | 2006-113176 A | 4/2006 |

(Continued)

OTHER PUBLICATIONS

International Search Report (translated version); International Application No. PCT/JP2014/067019, filed Jun. 26, 2014; 11 pages.

(Continued)

*Primary Examiner* — Darryl J Collins
(74) *Attorney, Agent, or Firm* — Knobbe, Martens, Olson & Bear, LLP

(57) ABSTRACT

An optical lens device forms a condenser lens having a first lens of a positive focal length and a second lens of a negative focal length. The first and second lenses are stacked with their optical axis aligned. The first lens has a lens section, edge section and glass member having a linear expansion coefficient smaller than that of the lens section and the edge section to suppress shape change of the first lens due to temperature change of the first lens. The second lens, which is stacked with the first lens, is used for offsetting a change of the positive focal length generated in the first lens when the temperature varies. The glass member having a small linear expansion coefficient suppresses that shape change of the first lens which is not compensated by the second lens.

15 Claims, 5 Drawing Sheets

(58) Field of Classification Search
USPC .............. 359/795, 642, 741, 820, 665–667; 351/159.34, 159.68
See application file for complete search history.

(56) References Cited

U.S. PATENT DOCUMENTS

| | | |
|---|---|---|
| 2010/0073534 A1 | 3/2010 | Yano et al. |
| 2010/0302652 A1 | 12/2010 | Ozaki |
| 2011/0013070 A1 | 1/2011 | Hirao et al. |
| 2012/0249858 A1 | 10/2012 | Baba |
| 2013/0037054 A1 | 2/2013 | Saruya |
| 2013/0163101 A1 | 6/2013 | Fukuta et al. |
| 2015/0338602 A1* | 11/2015 | Furutake ............... G02B 7/021 359/793 |

FOREIGN PATENT DOCUMENTS

| | | | |
|---|---|---|---|
| JP | 2007-101878 A | 4/2007 | |
| JP | 2008-090026 A | 4/2008 | |
| JP | 2009-003130 A | 1/2009 | |
| JP | 2009-089306 A | 4/2009 | |
| JP | 2009-003130 * | 8/2009 | ............ G02B 7/021 |
| JP | 2009-244430 A | 10/2009 | |
| JP | 2011-070016 A | 4/2011 | |
| JP | 2011-138088 A | 7/2011 | |
| JP | 2012-032635 | 2/2012 | |
| JP | 2014-164033 A | 9/2014 | |
| WO | 2009/101928 A1 | 8/2009 | |
| WO | 2011/135979 A1 | 11/2011 | |
| WO | WO 2011-135979 * | 11/2011 | ............ G02B 3/00 |
| WO | 2015/005127 A1 | 1/2015 | |

OTHER PUBLICATIONS

International Preliminary Report on Patentability; International Application No. PCT/JP2014/067019; Filed: Jun. 26, 2014 (with English translation).

* cited by examiner

FIG.1
(a)
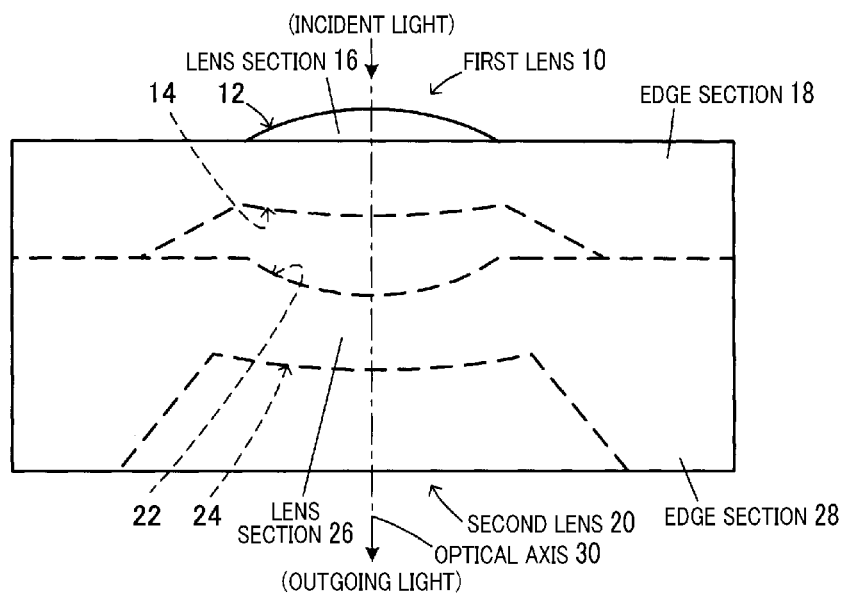
(b)
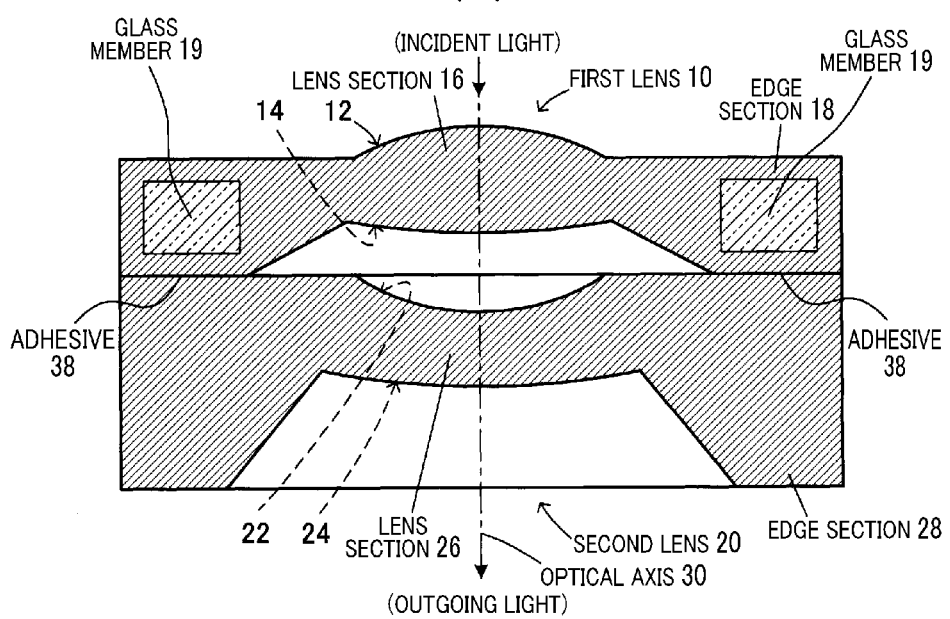

FIG. 4
(a)
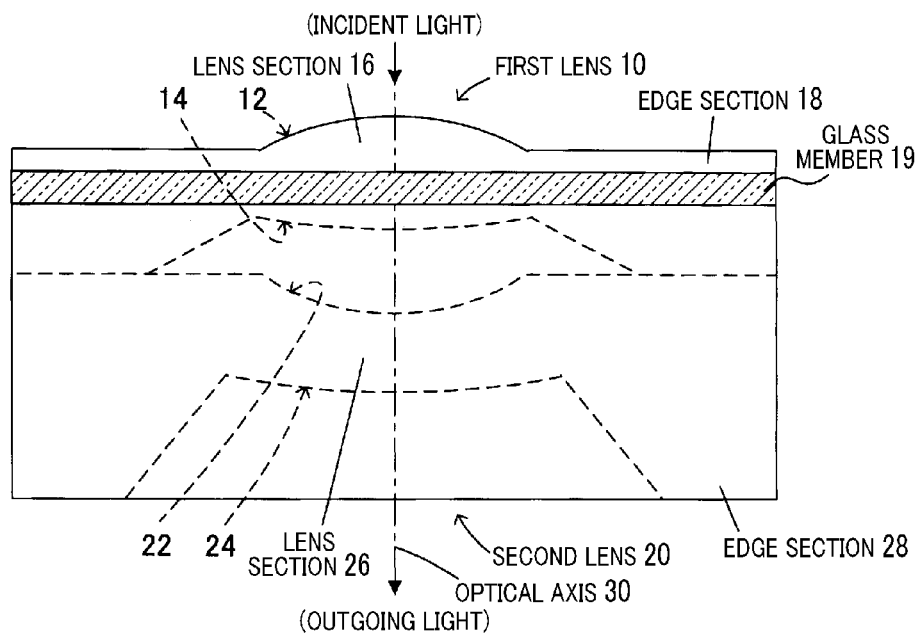
(b)
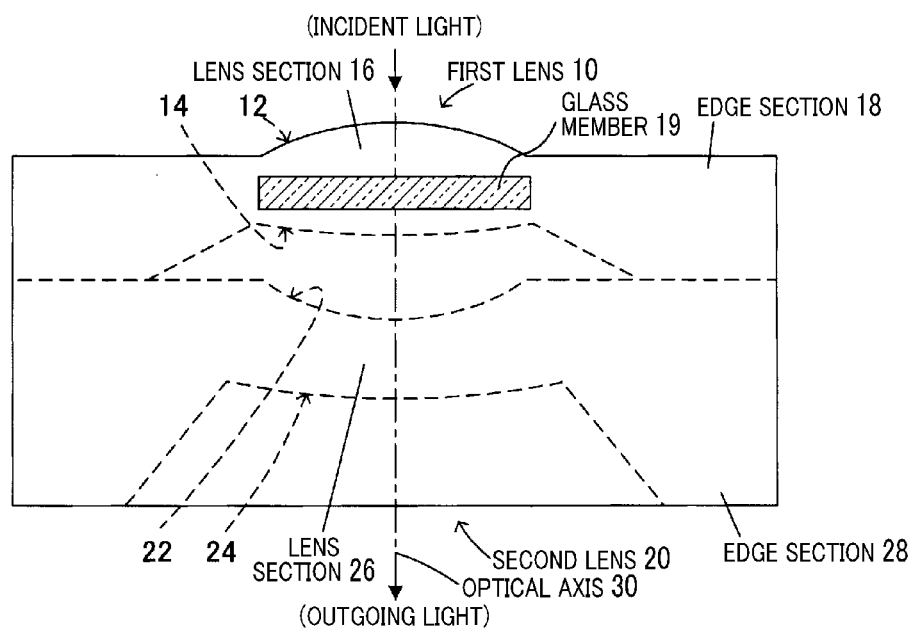

OPTICAL LENS DEVICE

TECHNICAL FIELD

The present invention relates to optical lens devices equipped with a lens having a positive focal length and a lens having a negative focal length.

BACKGROUND ART

It has been proposed for optical lens devices to have a structure in which two lenses are assembled together through a lens barrel section in order to reduce an aberration of the optical lens generated by temperature change. The lens barrier section is made of resin. This lens barrel section expands and shrinks due to temperature change, and this expands and shrinks a gap between these lenses in accordance with temperature change so as to offset a generated aberration. (For example, see patent document 1.)

In addition, there are known techniques, for example one technique adjusts a refractive index of the lens by using an electric signal (for example, see patent document 2), and another technique adjusts a refractive index of a lens by moving the lens under the control of an actuator (for example, see patent document 3).

CITATION LIST

Patent Literature

[Patent document 1] Japanese patent laid open publication No. JP 2003-6908;
[Patent document 2] Japanese patent laid open publication No. JP 2008-90026; and
[Patent document 3] Japanese patent laid open publication No. JP 2009-89306.

SUMMARY OF INVENTION

Technical Problem

However, the proposed techniques previously described require an additional actuator in order to adjust a refractive index of a lens and moving the lens, and a control device in order to drive the actuator. It is thereby necessary for these proposed techniques to have the lens barrel section for changing the gap between the lenses, even if it has a simple structure.

For this reason, the optical lens device as the conventional techniques previously described can suppress a change of lens characteristics caused due to temperature change, but require additional components to be arranged outside of the optical lens device. That is, these conventional techniques increase the number of components and are difficult to have a downsized structure.

It is an object of the present invention is to provide an optical lens device capable of suppressing a change of characteristics of lenses caused due to temperature change without increasing the number of components to be arranged outside of this lens optical device.

Solution to Problem

In order to achieve the purpose previously described, the present invention provides an optical lens device which forms a condenser lens. The condenser lens has a plurality of lenses, such as a first lens and a second lens. The first lens has a positive focal length and the second lens has a negative focal length. An optical axis of the first lens and an optical axis of the second lens are aligned with each other.

The first lens has a first member. The first member is made of a material having a linear expansion coefficient which is smaller than a linear expansion coefficient of a remaining section excepting the first member in the first lens. The first member is capable of suppressing a shape change of the first lens due to temperature change of the first lens.

That is, in the optical lens device having a plurality of the lenses which forms the condenser lens, the lens (first lens) having a positive focal length had a large capability of suppressing the focal length from varying due to temperature change when compared with the lens (second lens) having a negative focal length.

Further, the second lens is used with the first lens together in order to adjust a variation of the positive focal length of the first lens. For example, when the negative focal length of the second lens becomes long by the change of the refractive index thereof due to a temperature rise, the focal length of the overall optical lens device becomes short.

In this case, when the refractive index of each of the lenses becomes smaller and the (positive) focal length of the first lens becomes longer due to a temperature rise, because of it being possible to suppress a shape change of the first lens by using the first member having a small linear expansion coefficient, it is possible for the optical lens device to correct the variation generated in the first lens, which is difficult to adjust only by the second lens, and to further suppress the focal length of the overall optical lens device from changing.

According to the optical lens device of the present invention previously described, because the first lens has the first member having a small linear expansion coefficient, it is possible for the first member only to suppress a change of the focus position caused by a change of the refractive index of each of the lenses due to temperature change.

Accordingly, it is possible for the optical lens device of the present invention to suppress the lens characteristics thereof from changing caused by temperature change without adding any actuator and lens barrel section, which are required for conventional devices, and to have superior lens characteristics with a reduced size.

Further, each of the first lens and the second lens has an edge section, and it is acceptable for the optical lens device to have a structure in which the first lens and the second lens are stacked to each other through the edge sections of the first lens and the second lens. In this structure, it is acceptable to apply an adhesive between the edge sections stacked to each other. This makes it possible for the first lens and the second lens to adhere to each other through the adhesive. The adhesive is made of material having a linear expansion coefficient which is larger than a linear expansion coefficient of the second lens in order to promote a shape change of the second lens due to temperature change of the second lens.

In the structure previously described, the presence of the adhesive, which is applied between the edge sections of the first lens and the second lens, promotes a shape change of the second lens, and lengthens the negative focal length of the second lens by a change of the refractive index of the second lens due to a temperature rise, for example. As a result, this structure makes it possible to be shorter the focal length of the overall optical lens device. In addition, because the first lens has the first member which is formed in the edge section of the first lens, this structure makes it possible to avoid a promotion of a shape change of the first lens by the adhesive.

Accordingly, when the refractive index of each of the lenses is smaller by a temperature rise, and the (positive) focal length of the first lens lengthens, the presence of the first member having the small liner expansion coefficient can suppress a shape change of the first lens, and the adhesive having a large linear expansion coefficient can further promote a shape change of the second lens (that is, can more lengthen the negative focal length). This structure makes it possible to suppress the focal length of the overall optical lens device from changing.

It is also acceptable for the second lens to contain a second member so as to promote the shape change of the second lens dues to temperature change thereof. That is, it is possible to lengthen the negative focal length of the second lens. This second member is made of a material which has a linear expansion coefficient which is larger than a linear expansion coefficient of a remaining section excepting the second member in the second lens. The structure previously described makes it possible to more suppress the focal length of the overall optical lens device from changing.

As previously described, the optical lens device according to the present invention forms a condenser lens. The condenser lens has a plurality of lenses, i.e. the first lens having a positive focal length and the second lens having a negative focal length. An optical axis of the first lens and an optical axis of the second lens are aligned with each other. Further, the second lens has the second member made of a material having a linear expansion coefficient which is larger than that of a remaining section excepting the second member in the second lens so as to promote a shape change due to temperature change of the second lens.

The structure previously described makes it possible to more promote the shape change of the second lens by the second member having a large linear expansion coefficient when the focal length of each of the lenses is reduced by a temperature rise and the (positive) focal length of the first lens thereby lengthens, (because of enhancing the function capable of compensate the positive focal length of the first lens.) This makes it possible to suppress the focal length of the entire optical lens device from changing.

According to the structure of the optical lens device of the present invention, because the second lens has the second member having a large linear expansion coefficient, it is possible to suppress a change of the focus position caused by the change of the refractive index of each of the lenses due to a temperature change. Accordingly, the structure of the optical lens device according to the present invention can suppress a change of the lens characteristics caused by a temperature change without using an actuator or a lens barrel section etc., which is required for a conventional optical lens device. It is thereby possible for the present invention to provide the optical lens device having superior lens characteristics with a reduced size.

BRIEF DESCRIPTION OF DRAWINGS

FIG. 1 are views showing a structure of an optical lens device according to an exemplary embodiment of the present invention, FIG. 1 (a) shows a side view of the optical lens device, and FIG. 1 (b) shows a cross section of the optical lens device.

FIGS. 4 (a) and (b) are views explaining another structure of the optical lens device according to another modification of the exemplary embodiment of the present invention.

DESCRIPTION OF EMBODIMENTS

Figure 2:
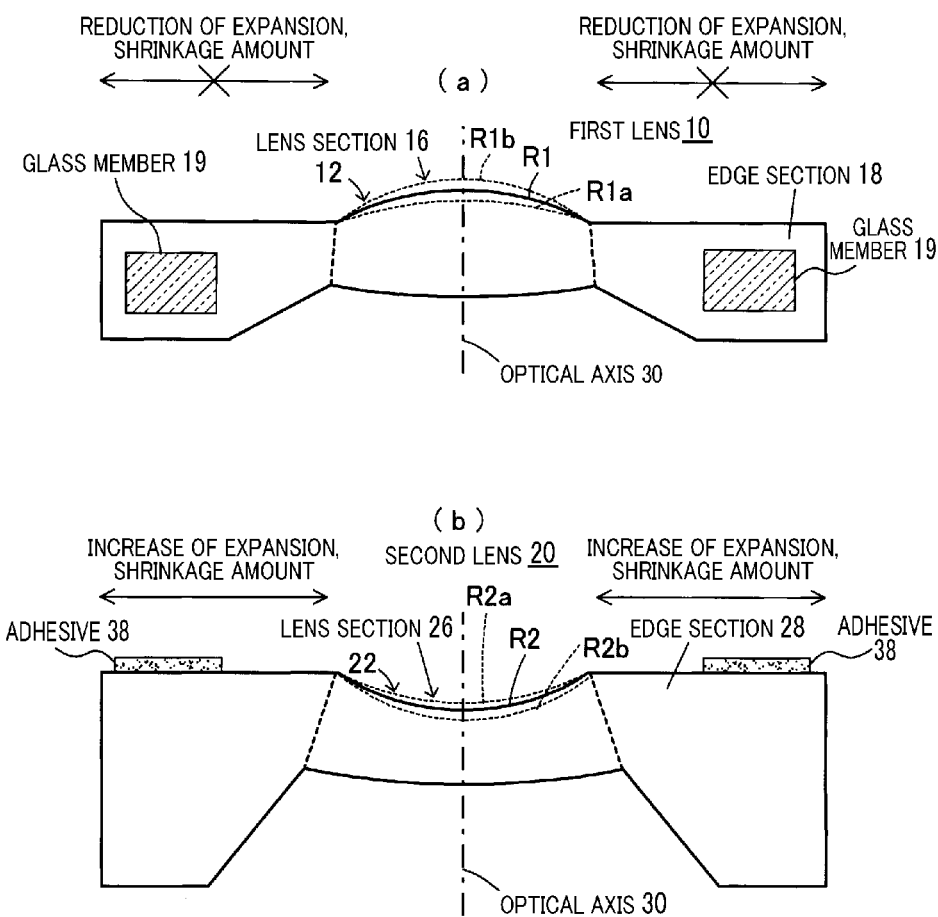
FIGS. 2 (a) and (b) are views explaining a behavior and effects of the optical lens device according to the exemplary embodiment of the present invention.

Hereinafter, various embodiments of the present invention will be described with reference to the accompanying drawings. In the following description of the various embodiments, like reference characters or numerals designate like or equivalent component parts throughout the several diagrams. A description will be given of exemplary embodiments and modifications according to the present invention with reference to drawings.

<Structure>

As shown in FIG. 1, the optical lens device according to the exemplary embodiment is equipped with a first lens 10 and a second lens 20. The first lens 10 has a positive focal length, and the second lens 20 has a negative focal length. The optical lens device according to the exemplary embodiment forms and acts as a condenser lens in which incident light from an object enters into the first lens, the incident light is condensed, and an outgoing light is outputted from the second lens 20 to outside.

The first lens 10 is a convex lens. A lens surface 12 at a front side of the first lens 10, into which incident light enters, has a protruded shape. A radius of curvature of the lens surface 12 is smaller than a radius of curvature of a lens surface 14 at a rear side of the first lens 10. The incident light is outputted through the lens surface 14.

The second lens 20 is a concave lens. A lens surface 22 at a front side of the second lens 20, into which incident light enters, has a depressed shape. A radius of curvature of the lens surface 22 is smaller than a radius of curvature of a lens surface 24 at a rear side of the second lens 20. The incident light is outputted through the lens surface 24.

A large part of the first lens 10 is made of epoxy resin. The overall second lens 20 is made of epoxy resin. The first lens 10 (in more detail, a large part thereof) and the second lens 20 are made of silicon resin, as epoxy resin, having a relatively large linear expansion coefficient.

Edge sections 18 and 28 are formed at a radially outer periphery of the first lens 10 and the second lens 20, respectively so that the outer periphery of a lens section 16 of the first lens 10 is surrounded by the edge section 18 to form an assembly, and the outer periphery of the lens section 26 is surrounded by the edge section 28 to form an assembly. Each of the lens sections 16 and 28 is made of epoxy resin previously described. The edge section indicates an edge formed around the outer periphery of the lens section.

The first lens 10 and the second lens 20 are arranged so that the optical axis 30 of them is coincided to each other (in other words, these optical axes 30 thereof are aligned). In the first lens 10 and the second lens 20, the edge section 18 and the edge section 28 have a thickness which is thicker than that of the outer periphery section of the lens section 16 and the lens section 26. The first lens 10 and the second lens 20 are stacked together through the edge section 18 and the edge section 28.

An adhesive 38 is applied on the stacked section (in more detail, between the edge section 18 and the edge section 38). The adhesive 38 is made of epoxy resin which is different material from the material used in the first lens 10 (in more detail, different in a major part thereof) and the second lens 20. The epoxy resin used in the adhesive 38 is a material made of silicon resin having a linear expansion coefficient which is larger than that of the silicon resin used in the first lens 10 (in more detail, a large part thereof) and the second lens 20.

The edge section 18 in the first lens 10 is filled with a glass member 19 made of glass. The glass used in the glass section 19 has a linear expansion coefficient which is smaller than a linear expansion coefficient of epoxy resin. In the edge section 18, a part, excepting the part made of glass member, is made of epoxy resin which is also used in the first lens 10 (in more detail, a major part thereof) and the second lens 20. The glass member 19 corresponds to a first member used in the claims.

(Behavior, Effects>

A description will now be given of the behavior and effects of the optical lens device according to the exemplary embodiment having the structure previously described. In general, whether it is made of resin or glass, and if it is a convex lens (an optical lens having a positive focal length), a refractive index of an optical lens is reduced due to a temperature rise, and increased due to a temperature fall.

Accordingly, in an optical lens having a positive focal length, when the temperature of the lens exceeds the normal temperature, the focal length thereof becomes long when compared with the focal lens thereof at the normal temperature. Further, the focal length thereof becomes short when compared with the focal lens thereof at the normal temperature.

In the optical lens having a positive focal length, when a temperature of the lens exceeds the normal temperature, a force is generated to be applied in a direction to expand the front surface of the lens, into which incident light enters. When a temperature of the lens becomes less than the normal temperature, a force is generated to be applied in a direction to shrink the front surface of the lens, into which incident light enters.

That is, as indicated with dotted lines shown in FIG. 2 ($a$), when a temperature rises, the lens section 16 and the edge section 18 of the first lens 10 are expanded, a force is generated in a direction so that a radius R1$a$ of curvature of the lens surface 12 at a front side of the first lens 10 becomes larger than a radius R1 of curvature of a normal shape of the first lens 10. This makes it possible for the first lens 10 to have a long focal length. Further, when the temperature falls, the lens section 16 and the edge section 18 shrink, a force is generated in a direction so that a radius R1$b$ of curvature of the lens surface 12 at the front side of the first lens 10 becomes smaller than the radius R1 of curvature of the normal shape of the first lens 10. This makes it possible for the first lens 10 to have a short focal length.

On the other hand, because the optical lens device according to the exemplary embodiment has the structure in which the glass member 19 is arranged in the edge section 18 of the first lens 10, this structure makes it possible to reduce an expansion amount of the lens section 16 and the edge section 18 when the lens 10 has a high temperature, and to reduce a shrinkage amount of the lens section 16 and the edge section 18 when the lens 10 has a low temperature, where, the glass member 19 has a linear expansion coefficient which is smaller than a linear expansion coefficient of the other section of the first lens 10. That is, it is possible to suppress the focal length from lengthening at a high temperature and from becoming shorter at a low temperature.

On the other hand, when a temperature of the lens having a negative focal length rises and exceeds the normal temperature, the focal length of the lens is shortened compared to when at normal temperature. When the temperature of the lens having the negative focal length falls, and becomes less than the normal temperature, the focal length of the lens is lengthened compared to than that at the normal temperature.

In the optical lens having a negative focal length, when a temperature of the lens exceeds the normal temperature, a force is generated to be applied in a direction to expand the front surface of the lens, into which incident light enters. When a temperature of the lens becomes less the normal temperature, a force is generated to be applied in a direction to shrink the front surface of the lens, into which incident light enters.

That is, as indicated by dotted lines shown in FIG. 2 ($b$), when a temperature rises, the lens section 26 and the edge section 28 of the second lens 20 are expanded, a force is generated in a direction so that a radius R2$a$ of curvature of the lens surface 22 at a front side of the second lens 20 becomes larger than a radius R2 of curvature of a normal shape of the second lens 20. This makes it possible for the focal length to be shorter. Further, when a temperature falls, the lens section 16 and the edge section 18 shrink, a force is generated in a direction so that a radius R2$b$ of curvature of the lens surface 22 at the front side of the second lens 20 becomes smaller than the radius R2 of curvature of the normal shape of the second lens 20. This makes it possible for the focal length to increase.

According to the optical lens device according to the exemplary embodiment, even if the refractive index of the first lens 10 and the refractive index of the second lens 20 change due to temperature change, it is possible to change the shape of the first lens 10 and the shape of the second lens 20 in order to offset a change in the focus position of each of the first lens 10 and the second lens 20 (in other words, the focus position of the entire optical lens device) generated due to the change of the refractive index.

In more detail, because the optical lens device according to the exemplary embodiment forms a condenser lens, a change of the refractive index of the first lens 10 is greater than the change of the refractive index of the second lens 20. Accordingly, when the refractive index of the first lens 10 is changed due to temperature change, it is difficult to offset the change of the refractive index of the first lens 10 by the change of the refractive index of the second lens 20 only.

Because the first lens 10 has the edge section 18 and the edge section 18 is equipped with the glass member 19 (which has a small linear expansion coefficient) in the optical lens device according to the exemplary embodiment, it is possible to offset the change of the refractive index of the first lens 10 caused by temperature change.

In addition, the optical lens device according to the exemplary embodiment has the structure in which the adhesive 38 is applied between the edge section 18 and the edge section 38 (which has a large linear expansion coefficient). This structure makes it possible to promote the shape change of the second lens which is in contact with the adhesive 38 when a temperature varies, and further offset the change caused by the refractive index by the shape change of the second lens 20. Because the glass member 19 (which has a small linear expansion coefficient) is inserted and arranged in the edge section 18 at which the adhesive 30 is in contact with the first lens 10, it is possible to reduce the force which reduces the shape change of the first lens 10 due to the shape change of the adhesive 38 when the temperature changes.

According to the optical lens device of the exemplary embodiment, even if the refractive index of each of the first lens 10 and the second lens 10 is changed due to temperature change, it is possible to offset a change of the focus position of each of the first lens 10 and the second lens 20 (in other words, the focus position of the entire optical lens device) caused by the change of the refractive index thereof by the shape change of the adhesive 38 and the shape change of the first lens 10 and the second lens 20.

Further, according to the present invention, it is possible to provide the optical lens device with a downsized structure capable of reducing an aberration of the lenses caused by temperature change without adding a device and component, which are necessary to obtain specific lens characteristics in conventional devices.

According to the optical lens device of the exemplary embodiment, because the glass member 19 is arranged in the edge section 18 of the first lens 10, which is different in material from the lens section 16, a part of the incident light of the lens section 16 in the first lens 10 is not reflected by the glass section 19. This makes it possible to provide the optical lens device having more excellent lens characteristics.

<Modifications>

Figure 3:
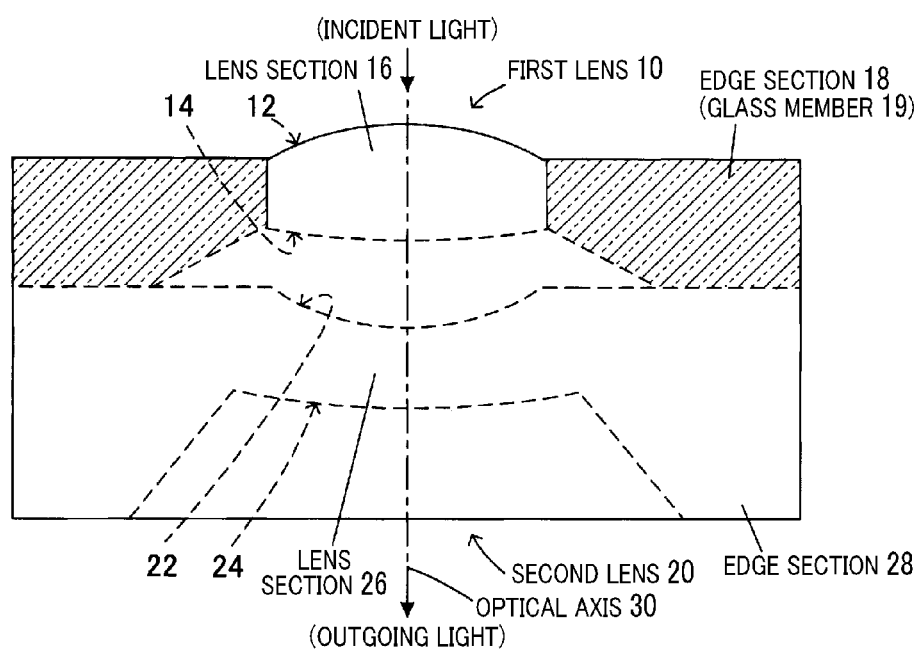
FIG. 3 is a view explaining a structure of the optical lens device according to another modification of the exemplary embodiment of the present invention, in which an edge section is made of a first member.

As shown in FIG. 3, it is acceptable for the first lens 10 to have the edge section 18 made of material (such as glass) having a linear expansion coefficient which is smaller than a linear expansion coefficient of epoxy resin. In other words, the edge section 18 of the first lens 10 is made of the glass member 19 as the first member having a linear expansion coefficient which is smaller than the linear expansion coefficient of epoxy resin.

This structure makes it possible to promote easy manufacture of the first lens 10 on a large scale by using a known imprinting molding technique which forms the lens section 16 on a glass wafer, for example. Further, the structure of the optical lens device shown in FIG. 3 makes it possible to more reduce a manufacturing cost.

It is also acceptable to use, as the glass member 19, a colored material having a transmittance which is lower than a transmittance of the parts of the first lens 10 in order to limit incident light received by the first lens 10.

This structure of the first lens 10 makes it possible to use the edge section 18 having an iris function. It is possible for the edge section 18 having the iris function to prevent unnecessary part of incident light from entering into and scattering by the outer peripheral part of the lens section 16.

<Other Modifications>

The concept of the present invention is not limited by the embodiments previously described. It is possible to have various modifications without limiting the scope of the present invention.

For example, the glass section 19 is formed in the edge section 18 of the first lens 10 in the optical lens device according to the exemplary embodiment previously described. The concept of the present invention is not limited by this. For example, as shown in FIG. 4 (a), it is possible to have a structure in which the glass member 19 is arranged in the lens section 16 and the edge section 18 along a horizontal direction. As shown in FIG. 4 (b), it is also possible to form the glass member 19 in the inside of the lens section 16, not in the edge section 18.

Because this structure also has the glass member 19 in the first lens 10, it is possible to offset fluctuation of the lens characteristics when temperature changes by a change of the refractive index caused by the shape change of the second lens 20 and by suppressing the refractive index from changing caused by the shape change of the first lens 10.

Figure 5:
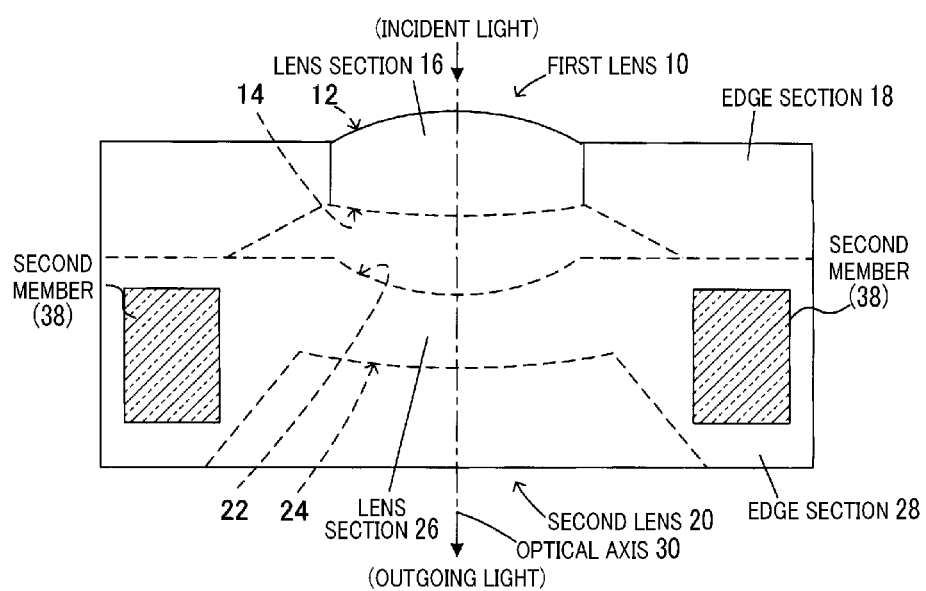
FIG. 5 is a view explaining another structure of the optical lens device according to another modification of the exemplary embodiment of the present invention.

Furthermore, as shown in FIG. 5, it is acceptable to use a member having a large linear expansion coefficient such as the adhesive 38 in the edge section 28 of the second lens 20. This structure makes it possible to promote a shape change of the second lens 20 when a temperature varies, and further offset deterioration of the characteristics caused by the refractive index generated by the shape change of the second lens 20.

It is acceptable to arrange the second member between the inside of the lens section 26 and the inside of the edge section 28 along the horizontal direction. It is also acceptable to arrange the second member in the inside of the lens section 26 instead of the edge section 28. It is also acceptable to have a structural combination in which the glass member 19 is arranged in the first lens 10 and the second member is arranged in the second lens 20. Still further, it is possible to arrange the second member in the second lens 20 instead of using the glass member 19 in the first lens 10.

REFERENCE SIGNS LIST

10 First lens, 12, 14 Lens surfaces, 16 Lens section, 18 Edge section, 19 Glass member, 20 Second lens, 22, 24 Lens surfaces, 26 Lens section, 18 Edge section, 30 Optical axis and 38 Adhesive.

The invention claimed is:

1. An optical lens device forming a condenser lens, comprising:
    a first lens having a positive focal length, the first lens further comprising a first convex lens section, a first edge section and a first member, the first edge section surrounding an outer periphery of the first convex lens section; and
    a second lens having a negative focal length, the second lens further comprising a second concave lens section and a second edge section, the second edge section surrounding an outer periphery of the second concave lens section,
    wherein the first lens is positioned over the second lens such that surfaces of the first edge section and the second edge section are in contact and an optical axis of the first lens and an optical axis of the second lens are aligned with each other, and
    wherein the first member of the first lens has a linear expansion coefficient that is smaller than a linear expansion coefficient of a remaining part excepting the first member in the first lens so as to suppress a shape change of the first lens due to a temperature change of the first lens.

2. The optical lens device according to claim 1, wherein the first member is embedded within the first edge section.

3. The optical lens device according to claim 2, wherein the first member is formed within the first edge section and has a transmittance that is smaller than a transmittance of the first convex lens section and a transmittance of the first edge section in the first lens so as to limit incident light received by the first lens.

4. The optical lens device according to claim 2, wherein an adhesive is applied on the surfaces of the first edge section and the second edge section on which the first lens and the second lens are stacked together and in contact with each other, and
    the adhesive is made of a member having a linear expansion coefficient that is greater than a linear expansion coefficient of the second lens so as to promote a shape change of the second lens due to a temperature change of the second lens.

5. The optical lens device according to claim 2, wherein a surface of each of the first edge section and the second edge section in a direction along which the first lens and the second lens are stacked together has a plate shape.

6. The optical lens device according to claim 2, wherein the second lens comprises a second member having a linear expansion coefficient that is greater than a linear expansion coefficient of a remaining part excepting the second member in the second lens so as to promote a shape change of the second lens due to temperature change of the second lens so that the second member is formed in a section of the second lens excepting surfaces of the second lens.

7. The optical lens device according to claim 1, wherein an entirety of the first edge section is formed from the first member.

8. The optical lens device according to claim 7, wherein the first member is formed within the first edge section and has a transmittance that is smaller than a transmittance of the first convex lens section and a transmittance of the first edge section in the first lens so as to limit incident light received by the first lens.

9. The optical lens device according to claim 7, wherein an adhesive is applied on surfaces of the first edge section and the second edge section on which the first lens and the second lens are stacked together and in contact with each other, and the adhesive is made of a member having a linear expansion coefficient that is greater than a linear expansion coefficient of the second lens so as to promote a shape change of the second lens due to a temperature change of the second lens.

10. The optical lens device according to claim 7, wherein a surface of each of the first edge section and the second edge section in a direction along which the first lens and the second lens are stacked together has a plate shape.

11. The optical lens device according to claim 7, wherein the second lens comprises a second member having a linear expansion coefficient that is greater than a linear expansion coefficient of a remaining part excepting the second member in the second lens so as to promote a shape change of the second lens due to temperature change of the second lens so that the second member is formed in a section of the second lens excepting surfaces of the second lens.

12. The optical lens device according to claim 1, wherein an adhesive is applied on the surfaces of the first edge section and the second edge section on which the first lens and the second lens are stacked together and in contact with each other, and the adhesive is made of a member having a linear expansion coefficient that is greater than a linear expansion coefficient of the second lens so as to promote a shape change of the second lens due to a temperature change of the second lens.

13. The optical lens device according to claim 1, wherein a surface of each of the first edge section and the second edge section in a direction along which the first lens and the second lens are stacked together has a plate shape.

14. The optical lens device according to claim 1, wherein the second lens comprises a second member having a linear expansion coefficient that is greater than a linear expansion coefficient of a remaining part excepting the second member in the second lens so as to promote a shape change of the second lens due to temperature change of the second lens so that the second member is formed in a section of the second lens excepting surfaces of the second lens.

15. An optical lens device forming a condenser lens, comprising:

a first lens having a positive focal length, the first lens further comprising a first convex lens section, a first edge section and a first member, the first edge section surrounding an outer periphery of the first convex lens section; and a second lens having a negative focal length, the second lens further comprising a second concave lens section, a second edge section and a second member, the second edge section surrounding an outer periphery of the second concave lens section, and the second member being formed in the second edge section, wherein the first lens is positioned over the second lens such that surfaces of the first edge section and the second edge section are in contact and an optical axis of the first lens and an optical axis of the second lens are aligned with each other, and wherein the second member of the second lens has a linear expansion coefficient that is greater than a linear expansion coefficient of a remaining part excepting the second member in the second lens so as to promote a shape change of the second lens due to a temperature change of the second lens.

* * * * *